United States Patent
Agarwal et al.

(10) Patent No.: US 11,386,665 B2
(45) Date of Patent: Jul. 12, 2022

(54) DISPLAY APPARATUS, SERVER, SYSTEM AND INFORMATION-PROVIDING METHODS THEREOF

(71) Applicant: SAMSUNG ELECTRONICS CO., LTD., Suwon-si (KR)

(72) Inventors: Vivek Agarwal, Suwon-si (KR); Ja Yoon Koo, Suwon-si (KR); Ernesto Sanches, Suwon-si (KR); Jatin Garg, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/960,666

(22) PCT Filed: Dec. 20, 2018

(86) PCT No.: PCT/KR2018/016373
§ 371 (c)(1),
(2) Date: Jul. 8, 2020

(87) PCT Pub. No.: WO2019/135523
PCT Pub. Date: Jul. 11, 2019

(65) Prior Publication Data
US 2020/0334468 A1 Oct. 22, 2020

(30) Foreign Application Priority Data
Jan. 8, 2018 (KR) .................. 10-2018-0002452

(51) Int. Cl.
*G06V 20/40* (2022.01)
*G06F 40/166* (2020.01)
(Continued)

(52) U.S. Cl.
CPC ............ *G06V 20/47* (2022.01); *G06F 40/166* (2020.01); *G06K 9/6256* (2013.01);
(Continued)

(58) Field of Classification Search
CPC ............ G06K 9/00751; G06K 9/4647; G06K 9/6256; G06F 40/166; G11B 27/031
See application file for complete search history.

(56) References Cited

U.S. PATENT DOCUMENTS

| 5,956,026 A | 9/1999 | Ratakonda |
| 6,535,639 B1 | 3/2003 | Uchihachi et al. |

(Continued)

FOREIGN PATENT DOCUMENTS

| CN | 105049875 | 11/2015 |
| JP | 2004-304676 | 10/2004 |

(Continued)

OTHER PUBLICATIONS

International Search Report for PCT/KR2018/016373, dated Apr. 19, 2019, 4 pages.

(Continued)

*Primary Examiner* — Mishawn N. Hunter
(74) *Attorney, Agent, or Firm* — Nixon & Vanderhye, P.C.

(57) ABSTRACT

The disclosure relates to an electronic apparatus, a method of controlling the same, and a computer program product, the electronic apparatus including: a memory configured to store an instruction; and a processor configured to execute the instruction to: extract video features of frames from a plurality of frames of video content, extract text features from transcript information of the video content, identify importance scores of the frames based on the video features and the text features, and select a key frame of the video content among the plurality of frames based on the identified importance scores. Thus, it is possible to provide faithful information about content to a user through the video summary considering not only the video features but also the text features.

14 Claims, 11 Drawing Sheets

(51) Int. Cl.
*G06K 9/62* (2022.01)
*G11B 27/031* (2006.01)
*G06V 10/46* (2022.01)
*G06V 10/50* (2022.01)

(52) U.S. Cl.
CPC .......... *G06V 10/464* (2022.01); *G06V 10/507* (2022.01); *G11B 27/031* (2013.01)

(56) References Cited

U.S. PATENT DOCUMENTS

| | | | |
|---|---|---|---|
| 6,549,643 | B1 | 4/2003 | Toklu et al. |
| 7,203,620 | B2 | 4/2007 | Li |
| 7,599,554 | B2 | 10/2009 | Agnihotri et al. |
| 7,751,592 | B1* | 7/2010 | Rosenberg ........... G06K 9/6293 382/112 |
| 2003/0081937 | A1 | 5/2003 | Li |
| 2006/0165379 | A1 | 7/2006 | Agnihotri et al. |
| 2006/0210157 | A1 | 9/2006 | Agnihotri et al. |
| 2016/0014482 | A1* | 1/2016 | Chen ................ H04N 21/26258 386/241 |
| 2017/0091558 | A1 | 3/2017 | Smolic et al. |
| 2019/0147366 | A1* | 5/2019 | Sankaran ............. G06N 3/0445 706/12 |

FOREIGN PATENT DOCUMENTS

| | | |
|---|---|---|
| JP | 2005-309427 | 11/2005 |
| JP | 2000-308008 | 11/2010 |
| KR | 10-2002-0072111 | 9/2002 |
| KR | 10-2009-0009106 | 1/2009 |
| KR | 10-1150748 | 6/2012 |

OTHER PUBLICATIONS

Written Opinion of the ISA for PCT/KR2018/016373, dated Apr. 19, 2019, 5 pages.

Otani et al., "Video Summarization using Deep Semantic Features", ACCV Sep. 28, 2016, Paper: https://arxiv.org/abs/1609.08758, 16 pages.

Office Action dated Mar. 17, 2022 in counterpart Korean Patent Application No. 10-2018-0002452 and English-language translation.

* cited by examiner

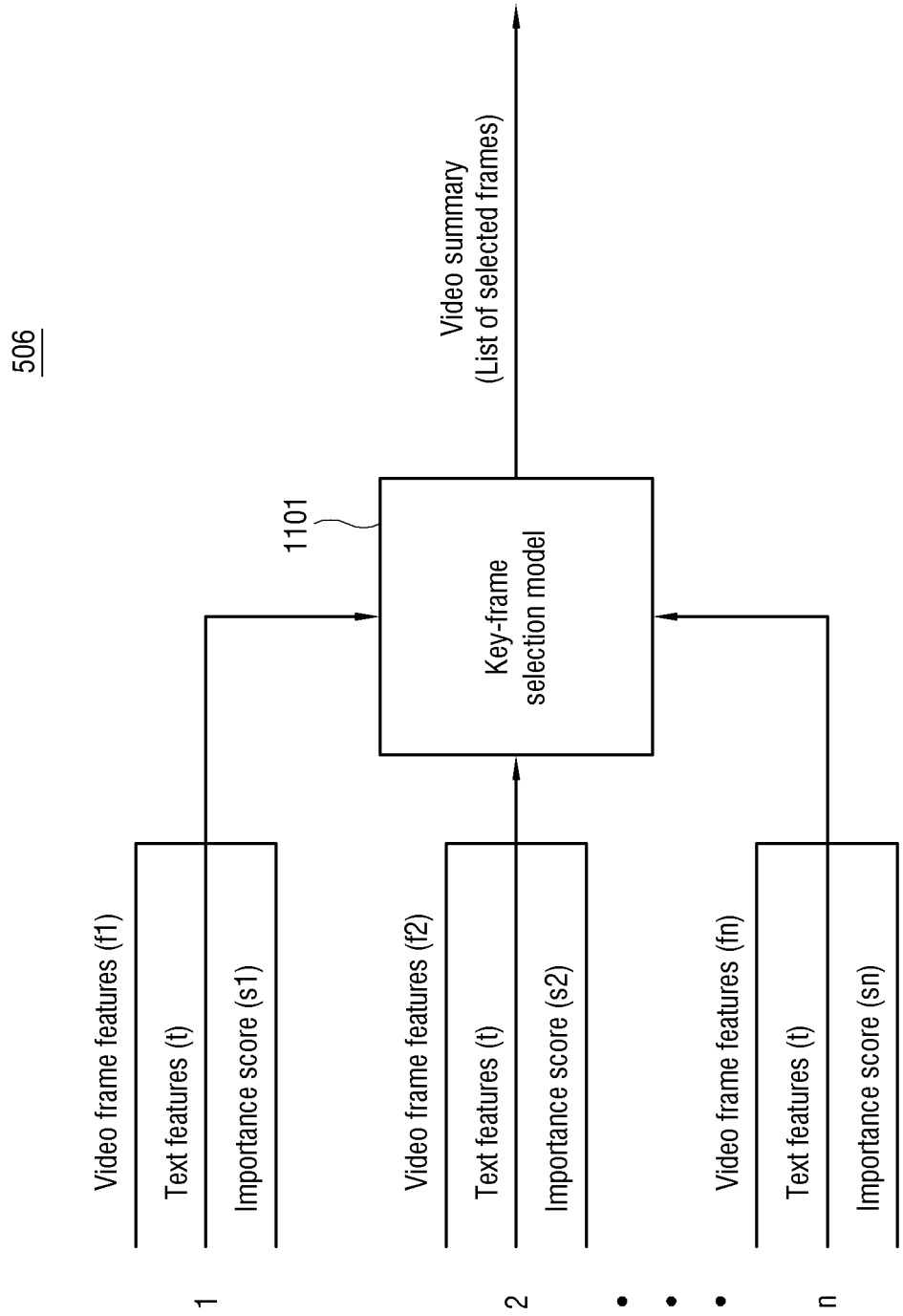

DISPLAY APPARATUS, SERVER, SYSTEM AND INFORMATION-PROVIDING METHODS THEREOF

This application is the U.S. national phase of International Application No. PCT/KR2018/016373 filed 20 Dec. 2018, which designated the U.S. and claims priority to KR Patent Application No. 10-2018-0002452 filed 8 Jan. 2018, the entire contents of each of which are hereby incorporated by reference.

FIELD

The disclosure relates to an electronic apparatus, a method of controlling the same and a computer program product, and more particularly to an electronic apparatus which processes video content, a method of controlling the same and a computer program product.

DESCRIPTION OF RELATED ART

An artificial intelligence (AI) system refers to a computer system that has intelligence as smart as a human, and becomes smarter as it performs learning and identifying by itself unlike the existing rule-based smart system. The AI system is improved in cognition and more accurately grasps a user's taste the more it is used, and thus the existing rule-based smart system has gradually been replaced by a deep-learning-based AI system.

An AI technology includes a machine learning (deep learning) and elementary technologies using the machine learning.

The machine learning refers to an algorithm technology that sorts/learns features of input data by itself, and the elementary technology refers to technology that uses a machine learning algorithm such as deep learning, etc. to copy recognition, decision and the like functions of a human brain and has technical fields such as linguistic understanding, visual understanding, inference/prediction, knowledge representation, motion control, etc.

Various fields to which the AI technology is applied are as follows. The linguistic understanding refers to technology that applies/processes human languages/letters, and includes natural language processing, machine translation, a dialogue system, question and answer, voice recognition/composition, etc. The visual understanding refers to technology that recognizes and processes an object like a human's vision, and includes object recognition, object tracking, image searching, human recognition, scene understanding, space understanding, image enhancement, etc. The inference/prediction refers to technology that identifies information and logically infer and predict the information, and includes knowledge/stochastic based prediction, optimization prediction, preference-based program, recommendation, etc. The knowledge representation refers to technology that automatically processes experience information of a human into knowledge data, and includes knowledge construction (generating/sorting data), knowledge management (utilizing data), etc. The motion control refers to technology that controls autonomous driving of a vehicle, and motion of a robot, and includes movement control (navigation, collision, driving), operation control (action control), etc.

SUMMARY

The disclosure provides an electronic apparatus, a method of controlling the same, and a computer program product, in which a learning model learned based on an AI algorithm is applied to video content, thereby generating a video summary considering not only video features but also text features.

According to an embodiment of the disclosure, an electronic apparatus includes: a memory configured to store an instruction; and a processor configured to execute the instruction to: extract video features of frames from a plurality of frames of video content, extract text features from transcript information of the video content, identify importance scores of the frames based on the video features and the text features, and select a key frame of the video content among the plurality of frames based on the identified importance scores. Thus, it is possible to provide faithful information about content to a user through the video summary considering not only the video features but also the text features.

The processor may be configured to create a model learned by performing machine learning based on the video features and the text features, and predict the importance scores of the frames based on the created learned-model. The processor may be configured to perform the machine learning based on a recurrent neural network for a time-series analysis. Thus, it is possible to provide a video summary gradually improved in quality through an iterative learning process.

The processor may be configured to extract the video features based on at least one of histogram of oriented gradient (HOG), scale invariant feature transform (SIFT), a color histogram, texture extraction, or machine learning. Thus, it is possible to utilize various algorithms considering the features of the video content, a user's preference, etc.

The processor may be configured to extract the text features based on at least one of bag of words (Bow), term frequency-inverse document frequency (TF-IDF), word-embedding, or machine learning based models like a neural network. The processor may be configured to: perform cleaning by removing or stemming a stop word from a text forming transcript information of the video content, and extract the text features from the cleaned text. Thus, it is possible to provide a video summary with a text of content features without redundant text.

The processor may be configured to produce a video summary with the selected key frames, and the electronic apparatus may further include a display configured to display the produced video summary. Thus, the video summary about the video content is automatically produced, and provided to a user by various methods.

Meanwhile, according to an embodiment of the disclosure, a method of controlling an electronic apparatus includes: extracting video features of frames from a plurality of frames of video content; extracting text features from transcript information of the video content; identifying importance scores of the frames based on the video features and the text features; and selecting a key frame of the video content among the plurality of frames based on the identified importance scores.

The identifying the importance scores may include: creating a model learned by performing machine learning based on the video features and the text features; and predicting the importance scores of the frames based on the created learned-model. The creating the model may include performing the machine learning based on a recurrent neural network for a time-series analysis. Thus, it is possible to provide a video summary gradually improved in quality through an iterative learning process.

The extracting the video features may include extracting the video features based on at least one of histogram of oriented gradient (HOG), scale invariant feature transform (SIFT), a color histogram, texture extraction, or machine learning. Thus, it is possible to utilize various algorithms considering the features of the video content, a user's preference, etc.

The extracting the text features may include extracting the text features based on at least one of bag of words (Bow), term frequency-inverse document frequency (TF-IDF), word-embedding, or machine learning based models like a neural network. The extracting the text features may include: performing cleaning by removing or stemming a stop word from a text forming transcript information of the video content; and extracting the text features from the cleaned text. Thus, it is possible to provide a video summary with a text of content features without redundant text.

The method may further include producing a video summary with the selected key frames. The method may further include displaying the produced video summary. Thus, the video summary about the video content is automatically produced, and provided to a user by various methods.

Meanwhile, an embodiment of the disclosure, a computer program product comprises a memory configured to store an instruction; and a processor, wherein the instruction is to extract video features of frames from a plurality of frames of video content, extract text features from transcript information of the video content, identify importance scores of the frames based on the video features and the text features, and select a key frame of the video content among the plurality of frames based on the identified importance scores. Thus, it is possible to provide faithful information about content to a user through the video summary considering not only the video features but also the text features.

As described above, there are provided an electronic apparatus, a method of controlling the same, and a computer program product, in which a learning model learned using an AI algorithm is applied to video content to extract video features and text features, and a video abstract is produced with key frames based on the extraction results, thereby efficiently providing intuitive information about the video content to a user.

BRIEF DESCRIPTION OF THE DRAWINGS

FIG. 11 is a view for explaining operations of an element for selecting a key frame in an electronic apparatus according to an embodiment of the disclosure.

DETAILED DESCRIPTION OF EXAMPLE EMBODIMENTS

Figure 1:
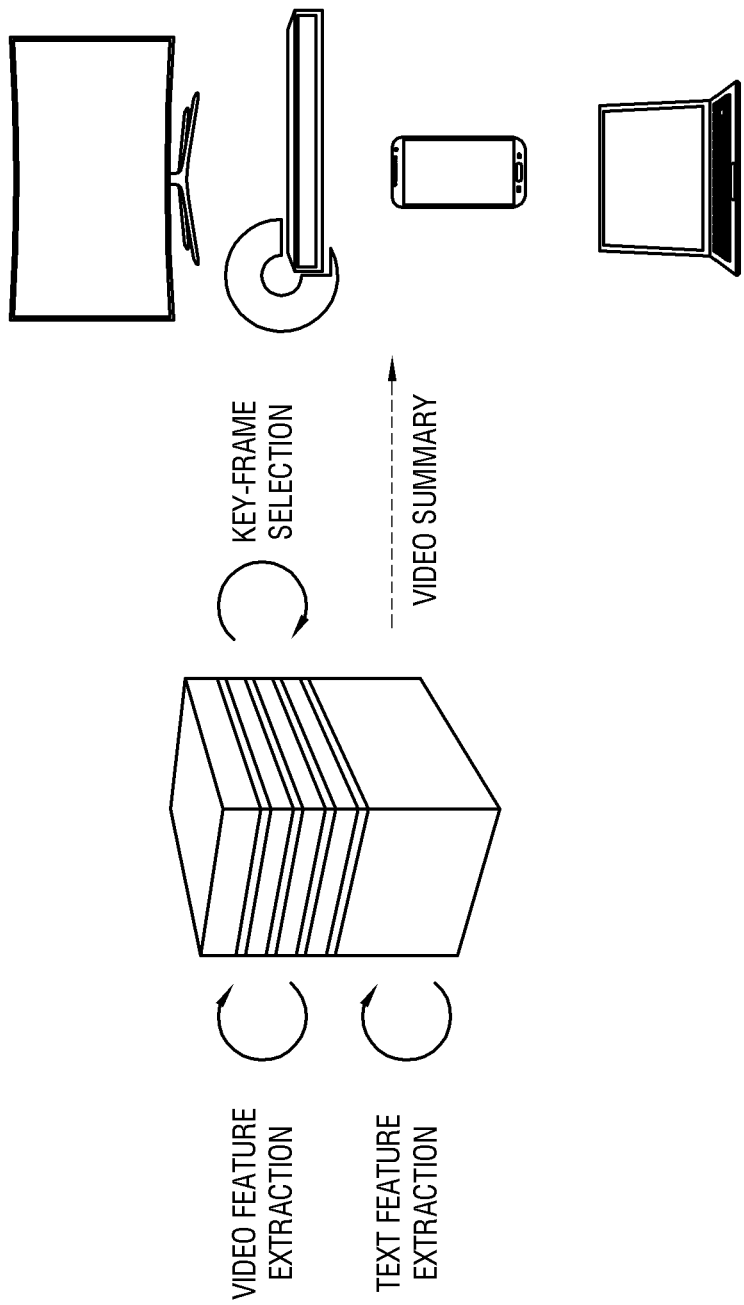
FIG. 1 illustrates an example that an electronic apparatus according to an embodiment of the disclosure provides a video summary.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

FIG. 1 illustrates an example that an electronic apparatus according to an embodiment of the disclosure provides a video summary.

The electronic apparatus 100 according to an embodiment of the disclosure performs video summarization to produce a video summary (hereinafter, also referred to as a video abstract) from video content (hereinafter, also referred to as video).

As shown in FIG. 1, the electronic apparatus 100 according to an embodiment of the disclosure extracts video features and text features from video content, selects a key frame from a plurality of frames of the video content based on the extracted video and text features, and produces a video summary with the selected key frame.

Figure 2:
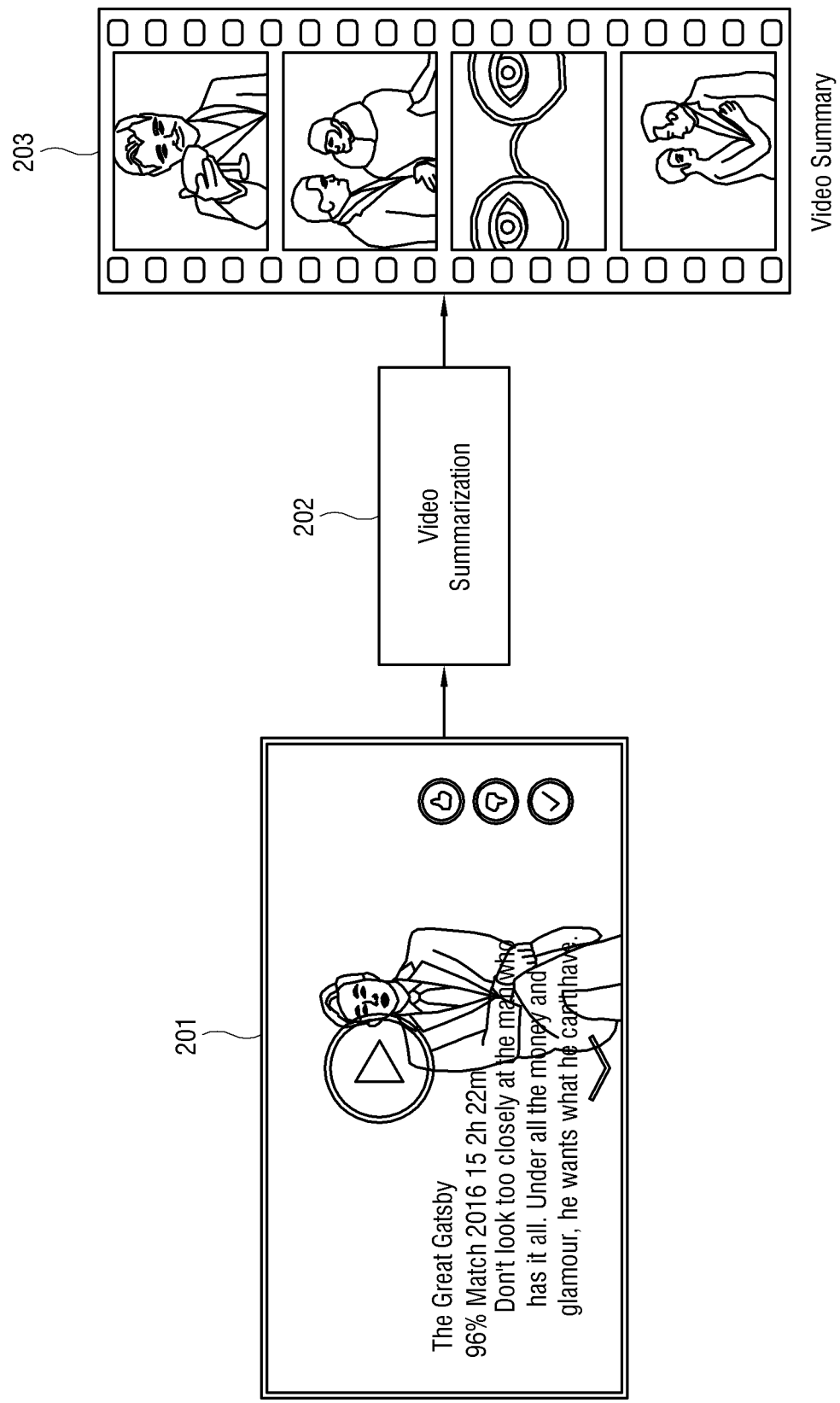
FIG. 2 schematically illustrates video summarization according to an embodiment of the disclosure.

FIG. 2 schematically illustrates video summarization according to an embodiment of the disclosure.

As shown in FIG. 2, video summarization 202 is defined as a process for producing content 203 that represents an entire video 201 based on a visual summary of a predetermined video. The length of the video summary 203 is shorter than that of the entire video 201, and an ideal video summary is to encapsulate all important events or key frames of a video.

The electronic apparatus 100 according to an embodiment of the disclosure is embodied by various apparatuses capable of performing the video summarization regardless of its name or shape.

According to an embodiment, the electronic apparatus 100, as shown in FIG. 1, includes a server that provides a video summary produced by processing video content. An apparatus, which receives the video summary from the server (hereinafter, also referred to as a client), may be embodied by an apparatus capable of displaying the video summary but not limited to this embodiment. The client may for example include at least one among a television such as a smart TV, an optical disc player for a blu-ray disc, a digital versatile disc (DVD), etc. an audio/video (AV) receiver, a set-top box (STB), a streaming device or the like content player provided as a general device for reproducing or relaying content, a mobile device such as a mobile phone, a smart phone, a tablet and the like smart pad, etc., and a personal computer (PC) such as a laptop computer or a desktop computer. There are no limits to connection between the server and the client, and interfaces of various wired/wireless standards may be used for the connection.

According to an alternative embodiment, the electronic apparatus 100 may be embodied by an apparatus which can autonomously produce and display a video summary from video content. For example, the electronic apparatus 100 includes a display apparatus such as a smart TV, which displays video content, a video processing apparatus such as a set-top box, which receives video content as a video-on-demand (VOD) service, or a terminal such as a smart phone.

The foregoing display apparatus according to an embodiment of the disclosure receives video content from an external content source and processes the video content based on a preset video processing process to thereby display an image. For example, the display apparatus may be embodied by a television (TV) that processes a broadcast content based on a broadcast signal/broadcast information/broadcast data received from a transmitter of a broadcasting station. The broadcast signal received in the display apparatus may be received through a terrestrial wave, a cable, a satellite, etc., and a content source in this embodiment is not limited to the broadcasting station. That is, any apparatus or station capable of transmitting and receiving information may be included in the content source according to the disclosure.

Standards of a signal received in the display apparatus may be variously achieved corresponding to the types of the display apparatus. For example, the display apparatus may receive a radio frequency (RF) signal from a broadcasting station wirelessly, or may receive a video signal through a wire based on composite video, component video, super video, Syndicat des Constructeurs d'Appareils Radiorécepteurs et Téléviseurs (SCART), high definition multimedia interface (HDMI), or the like standards.

Further, the display apparatus may receive video/audio content from various external apparatuses. Further, the display apparatus may process a signal to display a moving image, a still image, an application, an on-screen display (OSD), a user interface (UI, hereinafter, also referred to as a graphic user interface (GUI) allowing a user to make selection, etc. on a screen, based on a signal/data stored in an internal/external storing medium or received by streaming.

Figure 3:
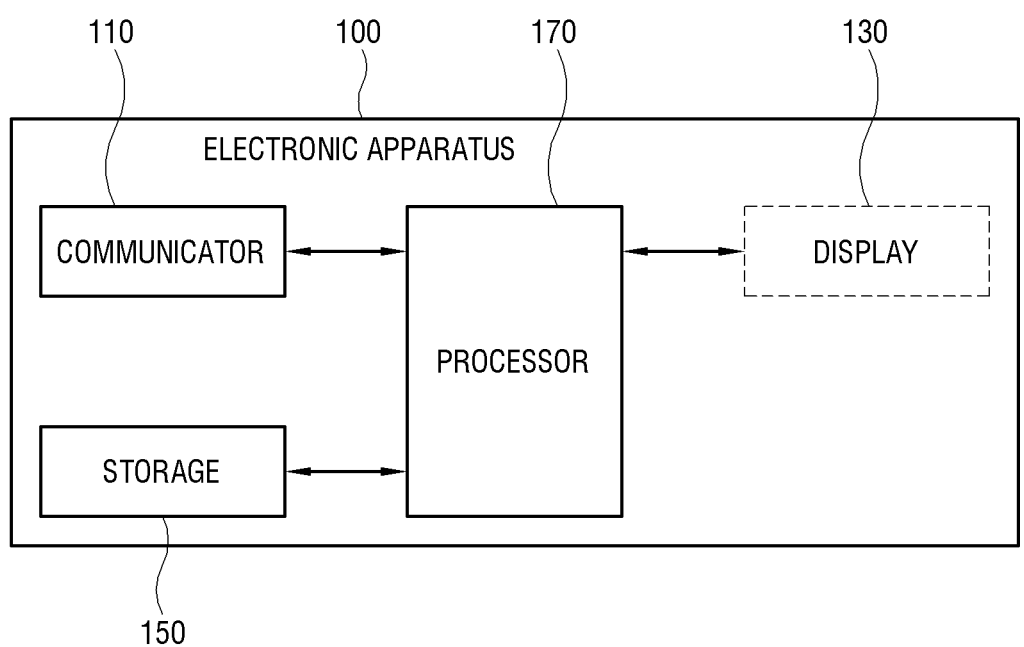
FIG. 3 is a block diagram of an electronic apparatus 100 according to an embodiment of the disclosure.

Further, the video content may be based on data stored in a flash memory, a hard disk drive, and the like nonvolatile storage (see '150' in FIG. 3). The storage 150 may be provided inside or outside the display apparatus, and the display apparatus may include a connector to which the storage 150 is connected when the storage 150 is provided outside the display apparatus.

Further, the video content may be based on data received through the Internet or the like network. In this case, the display apparatus may receive a video signal through a communicator (see '110' in FIG. 3) to be described later.

According to an embodiment, the display apparatus may be embodied by a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

The foregoing video processing apparatus according to an embodiment of the disclosure is connected to the display apparatus, and transmits a signal corresponding to an image displayed on the display apparatus. Specifically, the video processing apparatus processes video content provided from an external content source based on a preset video processing process, and outputs the processed video content to the display apparatus. The processed video content is displayed as a corresponding image on the display apparatus.

The video/audio content received in the video processing apparatus may be received through a terrestrial wave, a cable, a satellite, etc. Further, the video processing apparatus may process a signal to display a moving image, a still image, an application, an OSD, a UI allowing a user to make selection, etc. on the screen of the display apparatus, based on a signal/data stored in an internal/external storing medium or received by streaming. Further, the video processing apparatus may provide an application of a predetermined service such as an SNS, finance, news, weather, a map, music, a movie, a game, an electronic book, etc. to a user through the display apparatus.

The electronic apparatus 100 embodied by the display apparatus or the video processing apparatus includes a video processor including a decoder for decoding a video signal to have a video format for the display apparatus, and a scaler for scaling the video signal according to the output standards of the display (see '130' in FIG. 3). According to an embodiment, the video processor may include a tuner to be tuned to a channel corresponding to a broadcast signal.

The decoder in this embodiment may for example be embodied by a moving picture experts group (MPEG) decoder. Here, there are no limits to the kinds of video processing process performed in the video processor. For example, the video processing process may perform at least one of various processes such as de-interlacing for converting an interlaced broadcast signal into a progressive broadcast signal, noise reduction for improving image quality, detail enhancement, frame refresh rate conversion, line scanning, etc.

The video processor may be embodied as each individual group for independently performing such a process, or as it is included in a system-on-chip (SoC) where various functions are integrated. A main SoC may include at least one microprocessor or central processing unit (CPU) as an example of the processor (see '170' in FIG. 3) to be described later.

Below, a detailed configuration of the electronic apparatus according to an embodiment of the disclosure will be described with the accompanying drawing.

FIG. 3 is a block diagram of an electronic apparatus 100 according to an embodiment of the disclosure.

As shown in FIG. 3, the electronic apparatus 100 includes a communicator 110, a display 130, a storage 150 and a processor 170. However, the configuration of the electronic apparatus 100 shown in FIG. 3 is merely an example, and the electronic apparatus 100 according to an embodiment of the disclosure may have another configuration. In other words, the electronic apparatus 100 according to an embodiment of the disclosure may include another element in addition to the elements shown in FIG. 3, for example, a user input receiver for receiving a user input like a remote controller, a video processor for processing a video signal, etc. or may exclude a certain element from the elements shown in FIG. 3, for example, the display 130 for displaying an image.

The communicator 110 is provided to communicate with an external apparatus through a wired or wireless communication method. The communicator 110 includes a wired and/or wireless communication module.

According to an embodiment, the communicator 110 includes at least one of Bluetooth, Bluetooth low energy, infrared data association (IrDA), Wi-Fi direct, Zigbee, ultra wideband (UWB), and near field communication (NFC) modules. The NFC module is provided to support wireless direct communication between the electronic apparatus 100 and the external apparatus without an access point (AP).

According to an embodiment, the communicator 110 further include a wireless local area network (WLAN) unit. The WLAN unit may wirelessly connect with the external device through the AP under control of the processor 170. The WLAN unit may include a Wi-Fi communication module.

According to an embodiment, the communicator 110 may include Ethernet and the like wired communication module.

The communicator 110 of the electronic apparatus 100 according to an embodiment of the disclosure may be achieved by one or combination of more than two among the NFC module, the WLAN unit and Ethernet. The communicator 110 may be embodied in the form of a device, a S/W module, a circuit, a chip, etc.

According to an embodiment of the disclosure, the communicator 110 receives video content from the outside. According to an alternative embodiment, the communicator 110 may provide a video summary produced based on video content to an external display apparatus.

The display 130 displays video content and/or a video summary of the video content.

There are no limits to the type of the display 130. For example, the display 130 may be embodied in various display types such as liquid crystal, plasma, light-emitting diodes, organic light-emitting diodes, a surface-conduction electron-emitter, a carbon nano-tube, nano-crystal, etc. The display 130 may additionally include an appended element (e.g. a driver) according to the display types.

The storage 150 is configured to store various pieces of data of the electronic apparatus 100. The storage 150 may be embodied by a nonvolatile memory (e.g. a writable read only memory (ROM)) in which data is retained even though power supplied to the electronic apparatus 100 is cut off, and which writes and reflects changes. That is, the storage 150 may be embodied by one of a flash memory, an erasable and programable read only memory (EPROM), and an electrically erasable and programmable read only memory (EEPROM). The storage 150 may further include a volatile memory such as a dynamic random-access memory (DRAM) or a static random access memory (SRAM), of which the reading or writing speed of the electronic apparatus 100 is faster than the nonvolatile memory.

Data stored in the storage 150 may for example include not only an operating system for operating the electronic apparatus 100, but also various applications to be run on the operating system, image data, appended data, etc.

Specifically, the storage 150 may be configured to store a signal or data input/output corresponding to operations of the elements under control of the processor 170. The storage 150 may be configured to store a control program for controlling the electronic apparatus 100, a UI related to an application provided by a manufacturer or downloaded from the outside, images for providing the UI, user information, a document, a database, or associated data.

In an embodiment of the disclosure, the term 'storage' is defined to include the storage 150, the ROM and the RAM provided as memories to which the program executed by the processor 170 is stored or loaded, or a memory card (not shown) (for example, a micro secure digital (SD) card, and a memory stick) mountable to the electronic apparatus 100.

The processor 170 performs control for operating general elements of the electronic apparatus 100. As at least one processor that loads a control program (or instruction) to implement such control operation, and executes the loaded control program, the processor 170 may include at least one of a central processing unit (CPU), a microprocessor, or an application processor (AP). The control program is installed in a nonvolatile memory, i.e. a read only memory (ROM), and at least a part of the installed control program is loaded to a volatile memory, i.e. a random access memory (RAM) and executed. The processor, the ROM, and the RAM are connected to one another through an internal bus.

The processor may include a single-core processor, a dual-core processor, a triple-core processor, a quad-core processor, and the like multiple-core processor. According to an embodiment, the processor may include a plurality of processors, for example, a main processor and a sub processor that operates in a sleep mode, e.g. when the content providing apparatus receives only standby power and does not fully operates.

When the electronic apparatus 100 according to an embodiment of the disclosure is embodied by a computer, the processor 170 may further include a graphic processing unit (GPU, not shown) for graphic processing.

Further, when the electronic apparatus 100 according to an alternative embodiment of the disclosure is embodied by a digital TV, a single processor may be provided. For example, the processor may be embodied in the form of a SoC where a core and the GPU are combined.

The processor 170 according to an embodiment may be achieved as included in a main SoC mounted to a built-in PCB of the electronic apparatus 100.

The control program may include a program(s) achieved in the form of at least one among a basic input/output system (BIOS), a device driver, an operating system, a firmware, a platform, and an application. According to an embodiment, the application may be previously installed or stored in the electronic apparatus 100 when the electronic apparatus 100 is manufactured, or may be installed in the electronic apparatus 100 for use in the future on the basis of data received corresponding to the application from the outside. The data of the application may for example be downloaded from an external server such as an application market to the electronic apparatus 100.

Such an external server is an example of a computer program product according to an embodiment, but not limited thereto.

That is, according to an alternative embodiment, the operations of the processor 170 may be achieved by a computer program stored in the computer program product (not shown) provided separately from the electronic apparatus 100. In this case, the computer program product includes a memory where an instruction corresponding to the computer program is stored, and a processor. When the instruction is executed by the processor, the instruction includes extracting video features of each frame from a plurality of frames of video content, extracting text features from transcript information of the video content, identifying importance of each frame based on the video features and the text features, and selecting a key frame of the video content among the plurality of frames based on the identified importance.

Thus, the electronic apparatus 100 downloads and executes the computer program stored in a separate computer program product, thereby performing the operations of the processor 170.

It will be understood that the following operations related to the process of the video content and the production of the video summary based on the processed video content are performed by the processor 170 of the electronic apparatus 100.

Below, control operations performed to produce the video summary from the video content according to an embodiment of the disclosure will be described with reference to the accompanying drawing.

Figure 4:
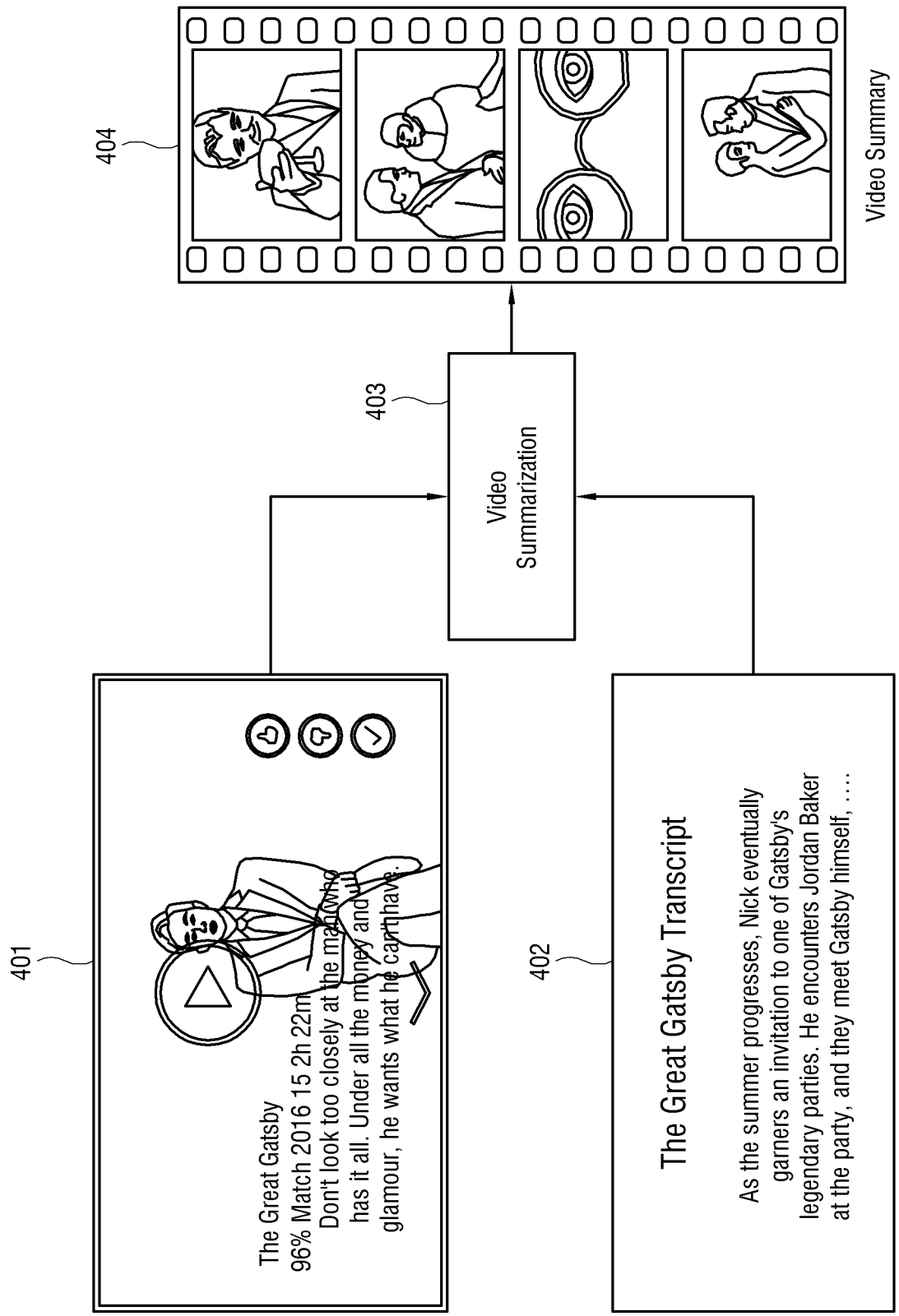
FIGS. 4 and 5 are views for explaining video summarization according to an embodiment of the disclosure.
Figure 5:
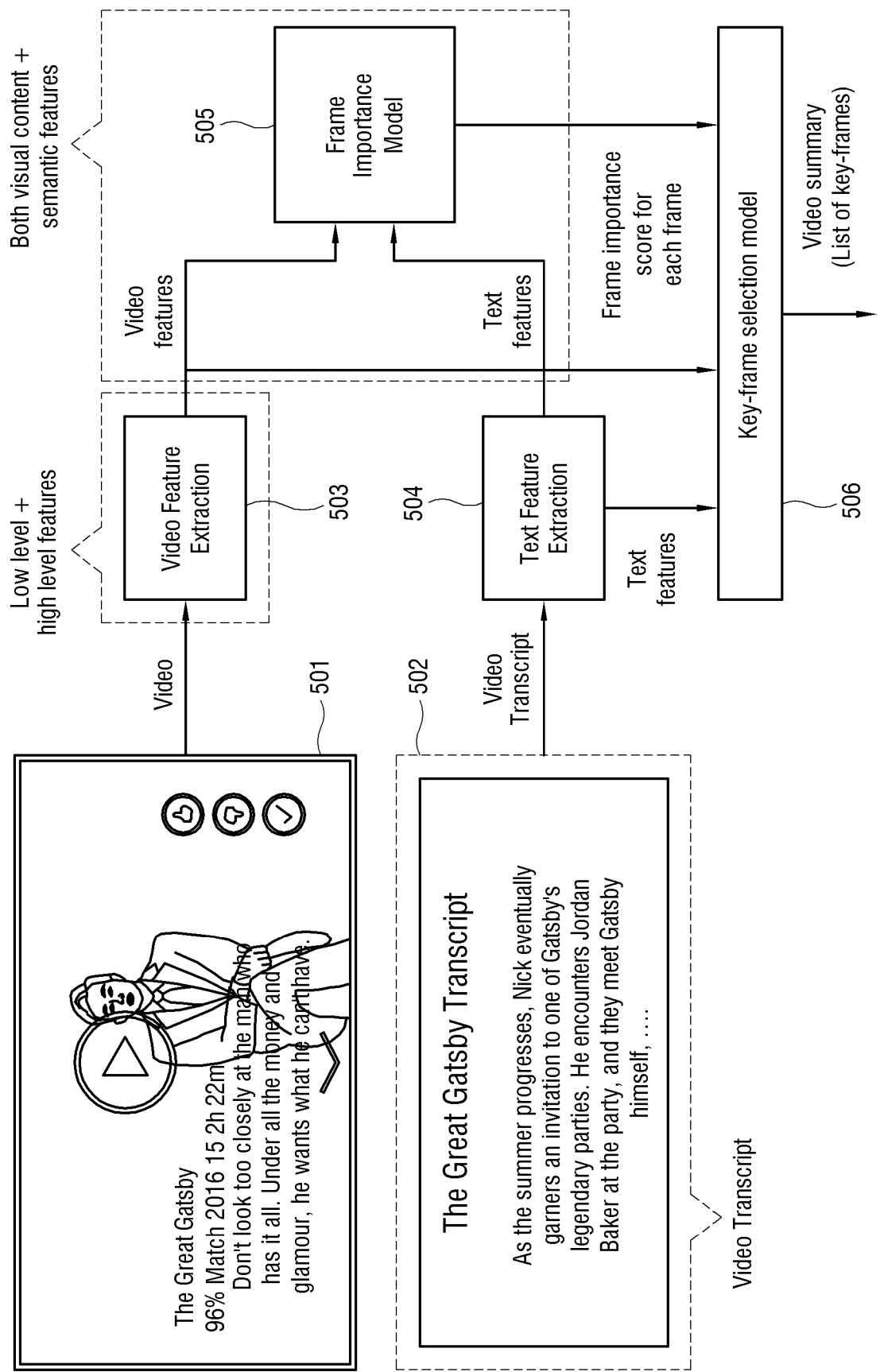

FIGS. 4 and 5 are views for explaining video summarization according to an embodiment of the disclosure.

As shown in FIG. 4, the electronic apparatus 100 according to an embodiment of the disclosure is controlled to extract video features from a video 401 of video content, extract text features from transcript information 402 of the video content, and perform video summarization 403 based on the extracted video and text features. A video summary 404 produced by the video summarization 403 as described above includes key frames selected by taking not only the video features but also the text features into account, and is semantically coherent with respect to video transcript information 402.

Specifically, referring to FIG. 5, the electronic apparatus 100 may include a video feature extractor 503, a text feature extractor 504, a frame importance model 505, and a key-frame selection model 506, as the elements for the video summarization.

According to an embodiment, the video feature extractor 503, the text feature extractor 504, the frame importance model 505, and the key-frame selection model 506 may be included in the processor 170 as software based on the control program to be executed by the hardware, i.e. the processor 170.

The video feature extractor 503 processes video content 501 having a plurality of frames, and extracts essential features from each frame. According to an embodiment, the video feature extractor 503 uses both low level features such as color and texture and high level features such as an object, a scene and a story line as shown in FIG. 5 to extract the video features.

The text feature extractor 504 processes video transcript 502 given as an input, and extracts the text features as semantic features from the video transcript 502.

The frame importance model 505 produces a model used to assign an important score with respect to a plurality of frames of the video content based on the video features and the text features. Here, it may be identified based on the importance whether a predetermined frame is included in the summary.

The key-frame selection model 506 selects a key frame for producing a video summary among a plurality of frames based on importance assigned by the frame importance model 505 to each frame. According to an embodiment, the key-frame selection model 506 may produce the video summary based on a list of key-frames corresponding to a plurality of selected key frames.

The electronic apparatus 100 according to an embodiment of the disclosure can produce a video summary having more robust and higher quality because the frame importance model 505 can perform the video summarization for producing the summary semantically coherent with the transcript information of the video content by identifying the frame importance based on both the visual content such as the video features and the semantic features such as the text features as shown in FIG. 5.

Below, detailed operations of extracting the video features and the text features and identifying the frame importance to thereby produce the video summary in the electronic apparatus according to an embodiment of the disclosure will be described.

Figure 6:
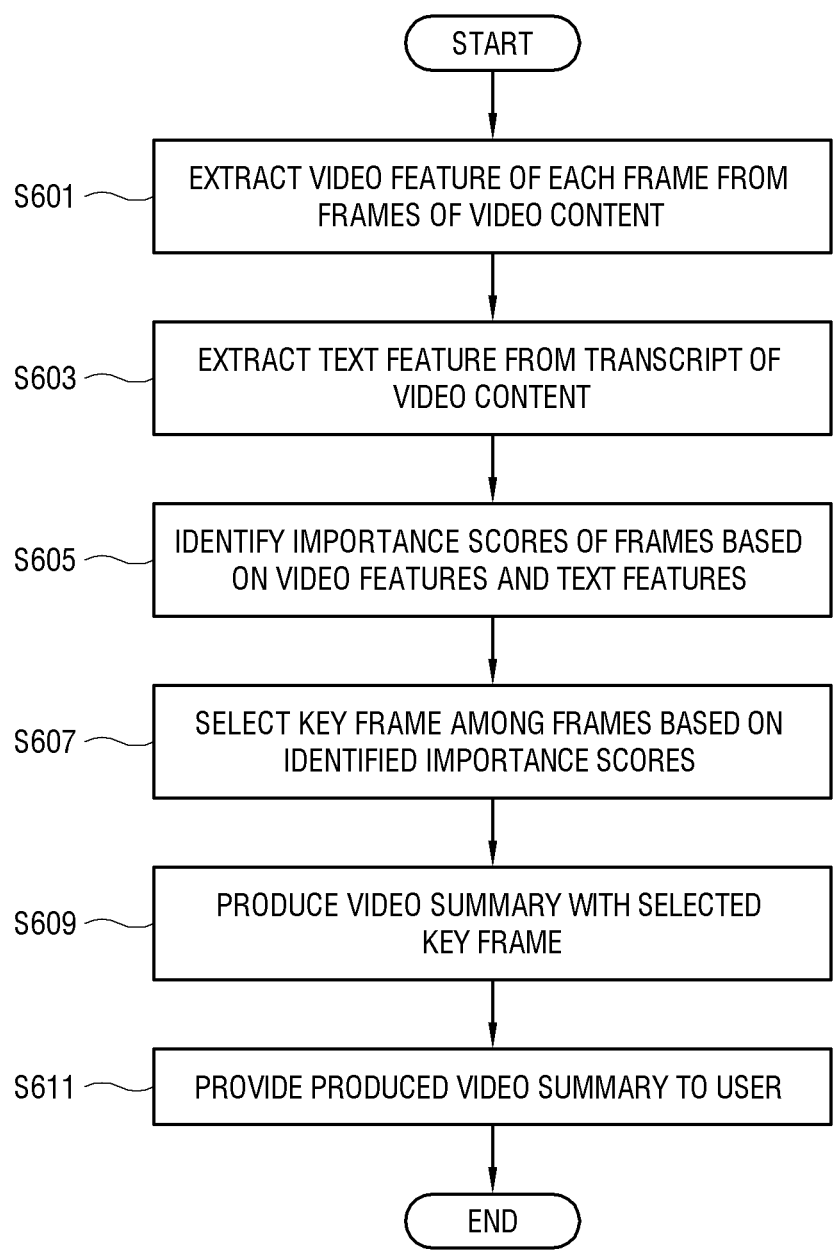
FIG. 6 is a flowchart showing a method of controlling an electronic apparatus according to an embodiment of the disclosure.

FIG. 6 is a flowchart showing a method of controlling an electronic apparatus according to an embodiment of the disclosure.

As shown in FIG. 6, the processor 170 of the electronic apparatus 100 extracts video features of each frame from a plurality of frames of video content (S601).

Figure 7:
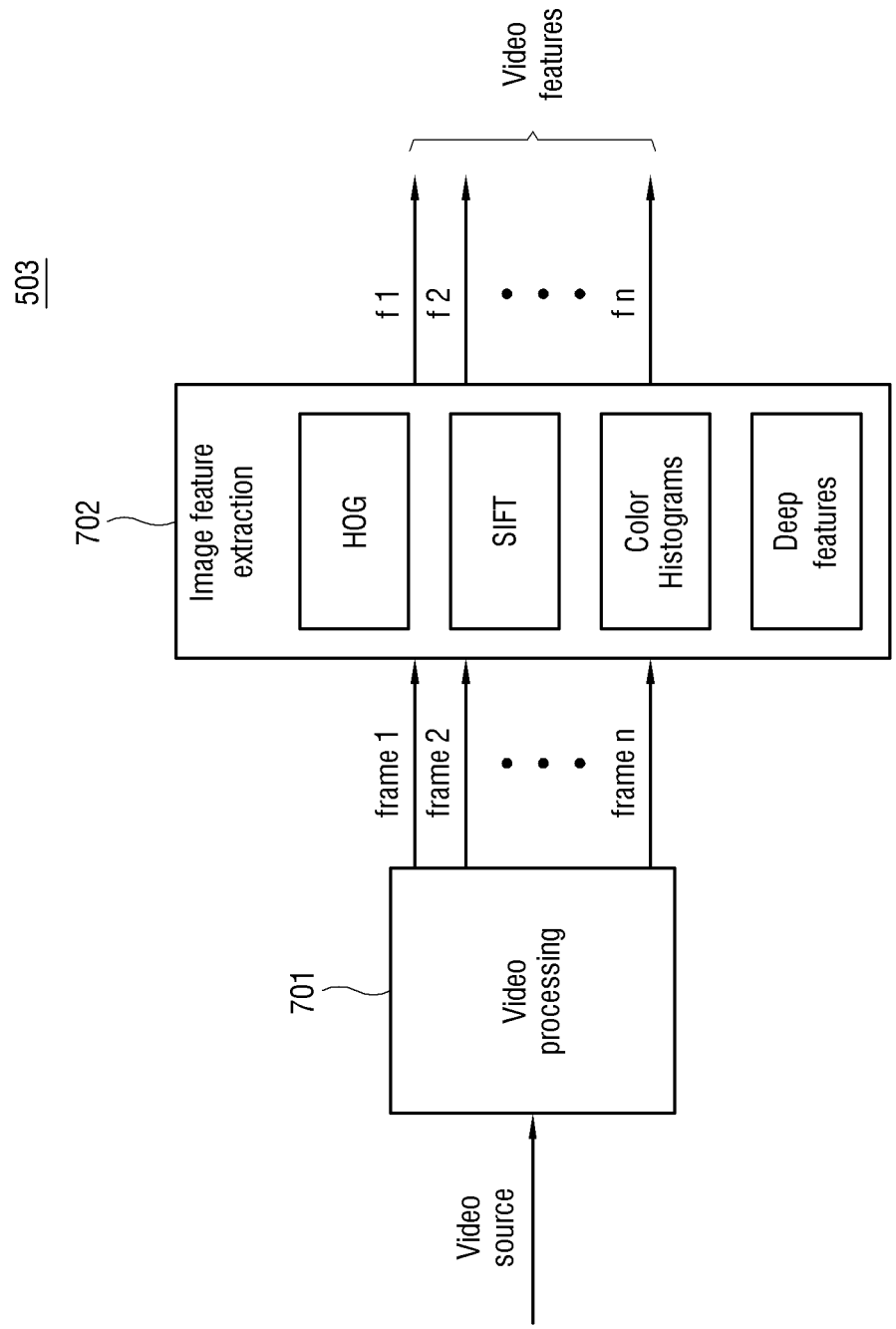
FIG. 7 is a view for explaining operations of an element for extracting video features in an electronic apparatus according to an embodiment of the disclosure.

FIG. 7 is a view for explaining operations of an element for extracting video features in an electronic apparatus according to an embodiment of the disclosure.

As shown in FIG. 7, the video feature extractor 503 performs a video process 701 to divide video content received from a video source into a plurality of frames fame 1, frame 2, . . . , frame n, and applies a video feature extraction process 702 to the plurality of frames to thereby extract video features f1, f2, . . . , fn.

According to an embodiment, the video feature extractor 503 produces a feature vector with respect to the plurality of frames through the video extraction process 702.

The video feature extraction process 702 for producing the feature vector may include at least one among histogram of oriented gradient (HOG), scale invariant feature transform (SIFT), color histogram, texture extraction, or machine or deep learning.

In the HOG, a target area of each frame is divided into cells of a predetermined size, a histogram is obtained with respect to orientations of edge pixels having a gradient magnitude higher than a certain value in each cell, and then bin values of this histogram are connected in a line to thereby produce a feature vector. The HOG is regarded as a matching method of an intermediate stage between templet matching and histogram matching, in which geometric information is maintained in units of blocks but a histogram is used within each block. Because the HOG uses silhouette information about an object, it may be suitable to identify an object having unique and distinctive silhouette information with an uncomplicated internal pattern like a human, a vehicle, etc. within the frame.

In the SITF, corner points or the like easily identifiable key points are selected in an image of each frame, and then a feature vector is extracted with regard to a local patch centering one the key points. In the SIFT, an image patch around the key points is divided into a predetermined number of blocks, e.g. 4 by 4 blocks, a histogram is obtained with respect to orientations and magnitudes of gradients of pixels in each block, and then bin values of this histogram are connected in a line to thereby produce a feature vector. The SIFT represents local gradient distribution characteristics around the key points, i.e. orientation of brightness variation and rapidness of brightness variation, and is strong to and excellent in distinguishability with respect to scale variation, transform, and orientation (rotation) change of an object.

The color histogram may produce a feature vector to represent distribution of brightness levels about pixels within an image of each frame, and the texture extraction may produce a feature vector to represent a predetermined texture, for example, brightness.

The machine learning is a branch of the AI, and is used to establish a model from a lot of data based on a multi-layered neural network. In the electronic apparatus 100 according to an embodiment of the disclosure, the video feature extractor 503 may be configured to produce a feature vector from an image of each frame through a model established based on iterative training.

According to an embodiment, the video feature extractor 503 performs the machine learning based on the model established by pre-trained features based on ImageNet dataset.

The processor 170 extracts text features from the transcript of the video content (S603).

Figure 8:
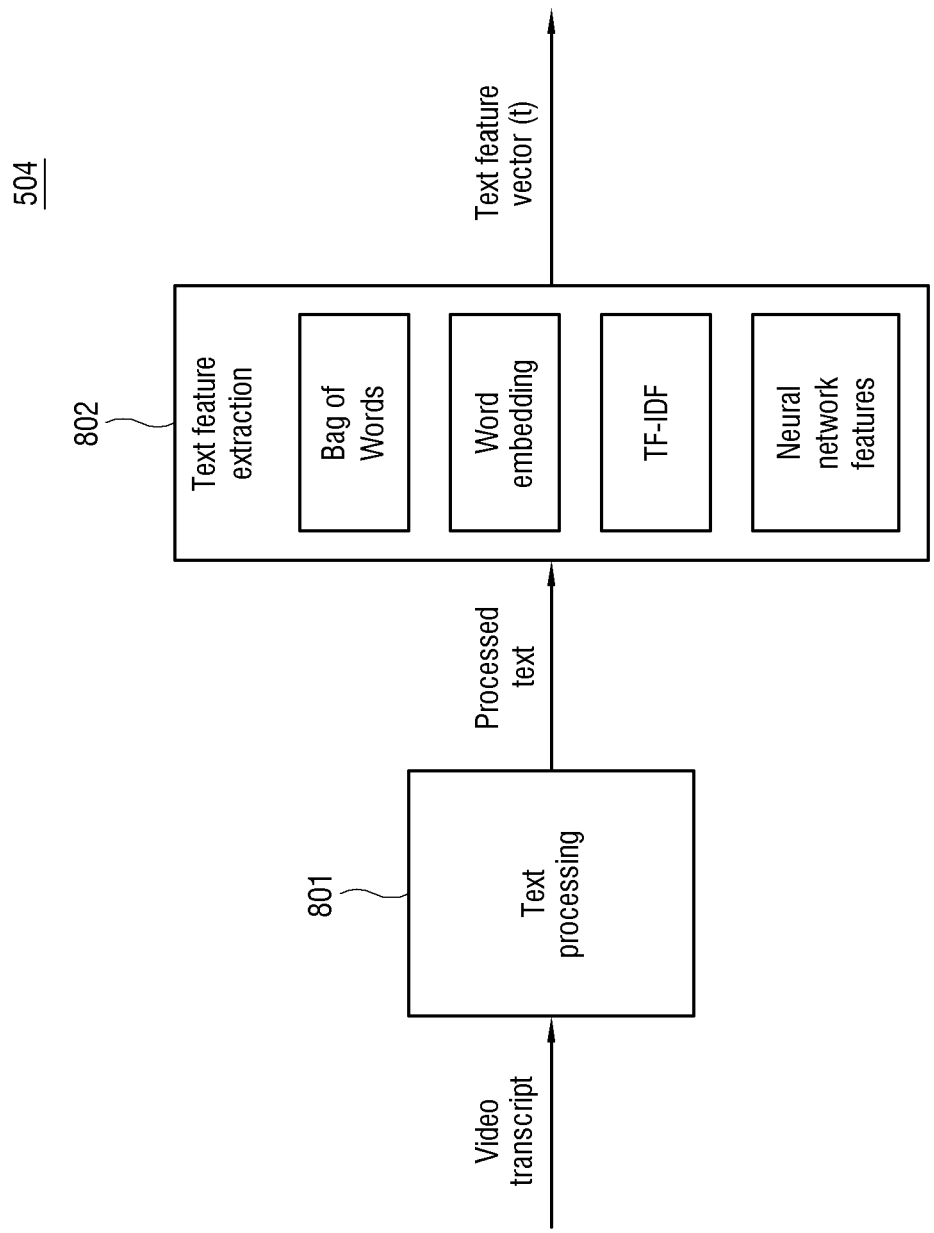
FIG. 8 is a view for explaining operations of an element for extracting text features in an electronic apparatus according to an embodiment of the disclosure.

FIG. 8 is a view for explaining operations of an element for extracting text features in an electronic apparatus according to an embodiment of the disclosure.

As shown in FIG. 8, the text feature extractor 504 performs a text process 801 to clean an input video transcript, and applies a text extraction process 802 to the cleaned text, thereby producing a feature vector t that represents the text features.

The cleaning includes removing a normal word, i.e. a stop word from a text forming the transcript information, or applying stemming to the word.

The text extraction process 802 for producing the feature vector may include at least one of bag of words (Bow), term frequency-inverse document frequency (TF-IDF) feature extraction, word-embedding models, or machine learning based models like a neural network. According to an embodiment, the word-embedding model may be established using a model based on word2vec as one of neural network language modeling methods.

The processor 170 identifies importance of each frame based on the video features and the text features extracted in the operations S601 and S603 (S605).

Figure 9:
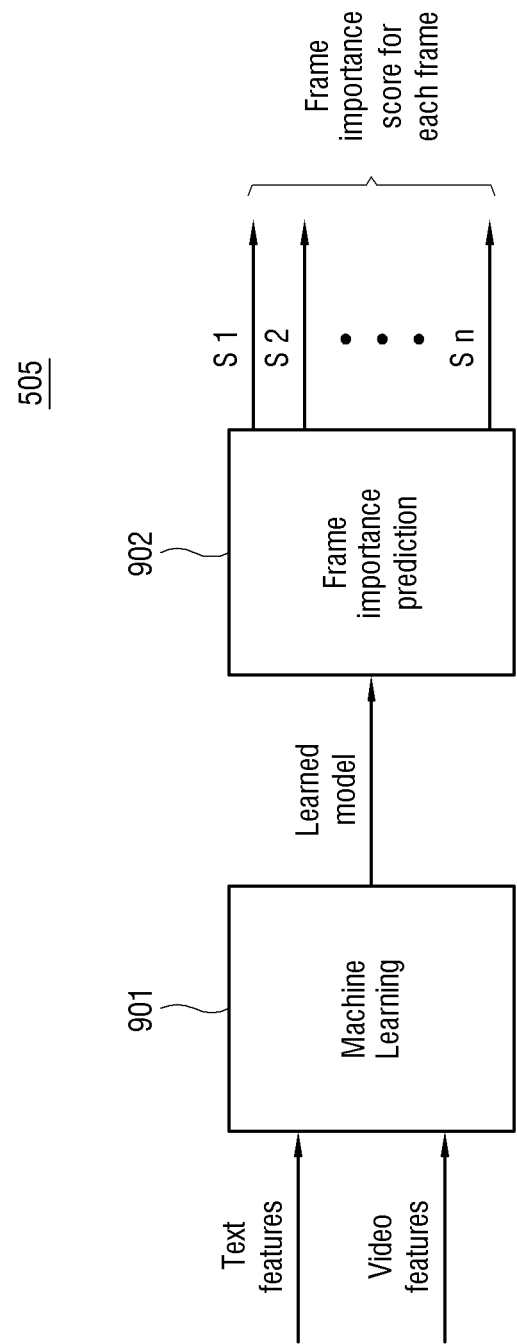
FIG. 9 is a view for explaining operations of an element for identifying frame importance with regard to a plurality of frames in an electronic apparatus according to an embodiment of the disclosure.
Figure 10:
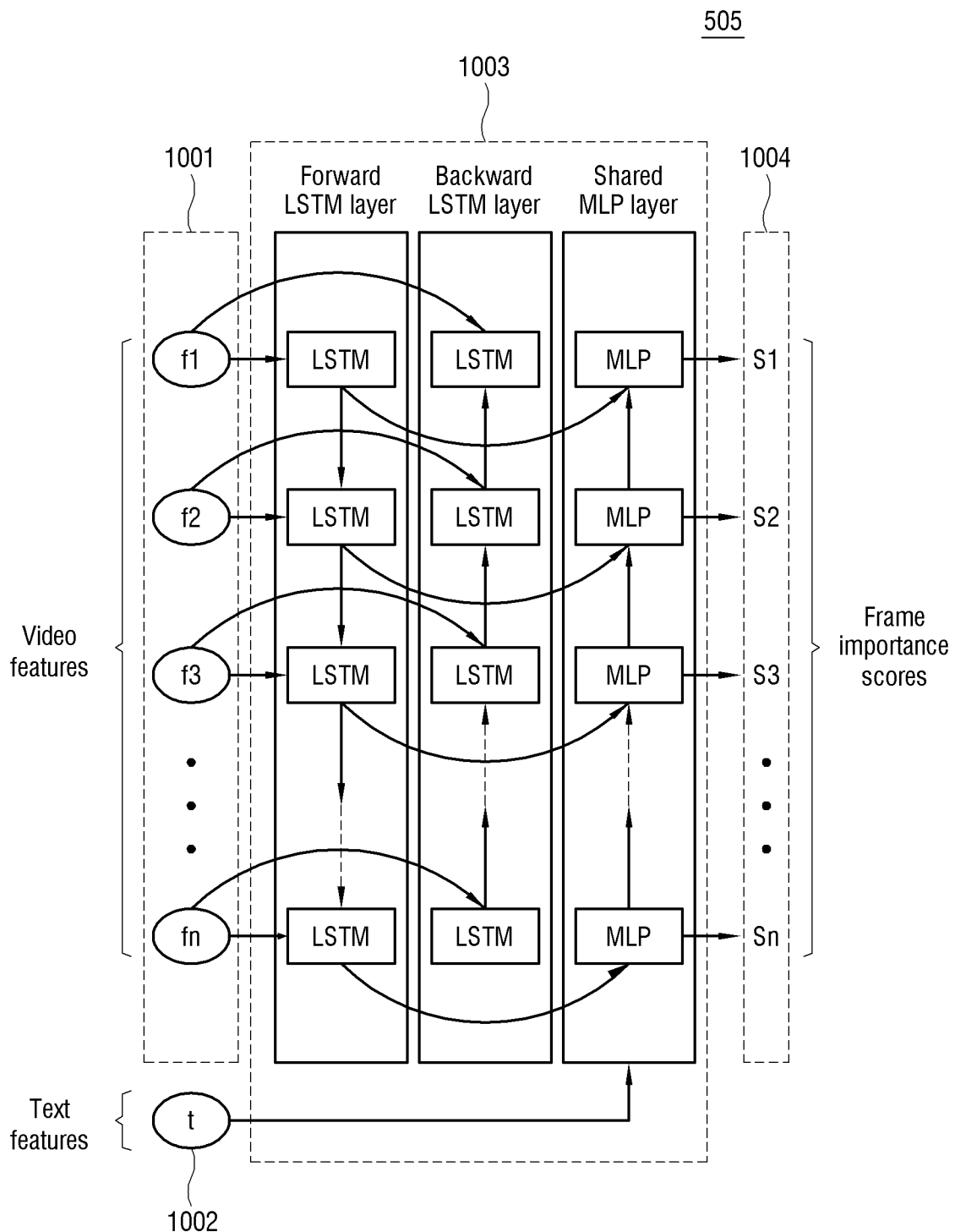
FIG. 10 illustrates a neural network structure for identifying frame importance.

FIG. 9 is a view for explaining operations of an element for identifying frame importance with regard to a plurality of frames in an electronic apparatus according to an embodiment of the disclosure, and FIG. 10 illustrates a neural network structure for identifying frame importance.

As shown in FIG. 9, the frame importance model 505 receives input video features from the video feature extractor 503, and receives input text features from the text feature extractor 504. The frame importance model 505 performs frame importance prediction 902 based on a model learned by applying machine learning 901 to the input video features and the input text features, thereby identifying importance scores S1, S2, . . . , Sn of the frames.

According to an embodiment, the frame importance model 505 creates a model used to assign the importance score to the frames based on the video features and the text features, in which the importance score indicates whether to keep each frame in the summary or not. Here, the frame importance model 505 may include a machine learning system for training a frame importance prediction model based on the video and text features as input values and frame importance scores as ground truth.

In the frame importance model 505, a model configuration is chosen for predicting the frame importance scores according to a method of processing the video and text features, the number and type of parameters, internal connections, a method of creating output data, etc. The model configuration is chosen to analyze a sequential nature of a video in addition to the text features.

Referring to FIG. 10, the model for predicting the frame importance scores according to an embodiment may be configured with recurrent neural networks for a time-series analysis including a plurality of fully connected layers. Here, the time-series analysis is based on a video sequence.

The recurrent neural network, as shown in FIG. 10, includes input layers 1001 and 1002, an intermediate layer 1003, and an output layer 1004. Here, the intermediate layer may include a series of hidden layers to transform an input vector. The hidden layers include neurons.

In the electronic apparatus 100 according to an embodiment of the disclosure, the recurrent neural network of the frame importance model 505 may for example include the hidden layers such as a forward long-short term memory (LSTM) layer, a backward LSTM layer, and a shared multilayer perceptron (MLP) layer.

According to an embodiment, the frame importance model 505 may perform a process of selecting and adjusting the model configuration based on modelling system evaluation results, so as to configure a model.

A model parameter is initialized with random or non-random data. A model error is calculated by comparing the frame importance prediction scores and the ground-truth importance score.

A stop condition is checked based on other evolution metrics than the model error. When the stop condition is not satisfied, training continues. When the stop condition is satisfied, a final model is saved for further use.

The processor 170 selects a key frame among the plurality of frames of the video content, based on the importance scores identified in the operation S605 (S607).

FIG. 11 is a view for explaining operations of an element for selecting a key frame in an electronic apparatus according to an embodiment of the disclosure.

As shown in FIG. 11, the key-frame selection model 506 receives input of the video features f1, f2, . . . , fn and the text features t of the extracted frames, and the importance scores s1, s2, . . . , sn of the frames. Here, the frame-level video features and the text features are optional in the input received in the key-frame selection model 506. In other words, the key-frame selection model 506 may be configured to receive the importance score of the frames from the frame importance model 505.

The key-frame selection model 506 performs key-frame selection modeling 1001 to produce a video summary with a list of selected frames. Here, the key-frame selection model 506 may select best key-frames to produce a video summary based on the frame importance scores and the optional video and text features.

According to an embodiment, the key-frame selection model 506 may for example be embodied by a simple heuristic system based on a method of selecting a predetermined number of frames with the highest frame importance scores.

According to another embodiment, the key-frame selection model 506 may be embodied by a stochastic-based system such as a determinantal Point process (DPP). The DPP eliminates redundant frames and includes diverse frames, thereby ensuring a fine balance between precision and recall.

According to still another embodiment, the key-frame selection model 506 may further employ the machine learning on top of the DPP in order to optimize an obtained result of selecting the key frames. Here, the machine learning model for selecting the key frames may be configured by a similar method to the model configuration for identifying the frame importance scores in the frame importance model 505.

The processor 170 produces a video summary with the key frames selected in the operation S607 (S609). Here, the produced video summary includes key frames selected by considering not only the video features of the video content but also even the text features, and is thus semantically coherent with the video transcript.

Then, the video summary produced in the operation S609 is provided to a user (S611). When the electronic apparatus 100 includes the display 130 like a TV or a smartphone, the video summary may be provided to a user through the electronic apparatus 100. When the electronic apparatus 100 connects with the display apparatus by a wire or wirelessly like a set-top box or a server, the video summary may be transmitted to the display apparatus and then provided to a user.

According to various embodiments as described above, the electronic apparatus 100 according to the disclosure controls the processor 170 to extract the video features from the plurality of frames of the video content, extract the text feature from the transcript of the video content, identify the importance scores of the frames based on the video features and the text features according to the frames, and produce the video summary with key frames selected based on the identified importance scores.

Although a few exemplary embodiments have been shown and described, it will be appreciated that changes may be made in these exemplary embodiments without departing from the scope defined in the appended claims.

What is claimed is:

1. An electronic apparatus comprising:
    a memory configured to store an instruction; and
    a processor configured to execute the instruction to:
        extract video features of frames from a plurality of frames of video content,
        extract text features from transcript information comprising text of the video content, the transcript information being provided separately from the video content,
        identify importance scores of the frames based on the video features and the text features,
        select at least one key frame of the video content among the plurality of frames based on the identified importance scores, and
        produce a video summary with the selected at least one key frame,
    wherein the processor is configured to:
        predict the importance scores of the frames corresponding to association with the text features using a model learned by performing machine learning, and
        select the at least one key frame to produce the video summary based on the predicted importance scores corresponding to association with the text features, the produced video summary being semantically coherent with respect to the transcript information.

2. The electronic apparatus according to claim 1, wherein the processor is configured to create the model, a configuration of the model being selected and adjusted through iterative training of the machine learning based on the video features and text features as input values and importance scores of the frames as ground truth to predict the importance scores of the frames corresponding to association with the text features, and predict the importance scores of the frames based on the created learned-model.

3. The electronic apparatus according to claim 2, wherein the processor is configured to perform the machine learning based on a recurrent neural network for a time-series analysis.

4. The electronic apparatus according to claim 1, wherein the processor is configured to extract the video features based on at least one of histogram of oriented gradient (HOG), scale invariant feature transform (SIFT), a color histogram, texture extraction, or machine learning.

5. The electronic apparatus according to claim 1, wherein the processor is configured to extract the text features based on at least one of bag of words (Bow), term frequency-inverse document frequency (TF-IDF), word-embedding, or machine learning based models.

6. The electronic apparatus according to claim 1, wherein the processor is configured to:
    perform cleaning by removing or stemming a stop word from the text comprising the transcript information of the video content, and
    extract the text features from the cleaned text.

7. The electronic apparatus according to claim 1, further comprising a display configured to display the produced video summary.

8. A method of controlling an electronic apparatus, comprising:
    extracting, by a processor, video features of frames from a plurality of frames of video content;
    extracting, by the processor, text features from transcript information comprising text of the video content, the transcript information being provided separately from the video content;
    identifying, by the processor, importance scores of the frames based on the video features and the text features;
    selecting, by the processor, at least one key frame of the video content among the plurality of frames based on the identified importance scores; and
    producing a video summary with the selected at least one key frame,
    wherein the identifying of the importance scores comprises predicting the importance scores of the frames corresponding to association with the text features using a model learned by performing machine leaning, and
    wherein the selecting of the at least one key frame comprises selecting the at least one key frame to produce the video summary based on the predicted importance scores corresponding to association with the text features, the produced video summary being semantically coherent with respect to the transcript information.

9. The method according to claim 8, wherein the identifying the importance scores comprises:
    creating the model, a configuration of the model being selected and adjusted through iterative training of the machine learning based on the video features and text features as input values and importance scores of the frames as ground truth to predict the importance scores of the frames corresponding to association with the text features; and predicting the importance scores of the frames based on the created learned-model.

10. The method according to claim 9, wherein the creating of the model comprises performing the machine learning based on a recurrent neural network for a time-series analysis.

11. The method according to claim 8, wherein the extracting of the video features comprises extracting the video features based on at least one of histogram of oriented gradient (HOG), scale invariant feature transform (SIFT), a color histogram, texture extraction, or machine learning.

12. The method according to claim 8, wherein the extracting the text features comprises extracting the text features based on at least one of bag of words (Bow), term frequency-inverse document frequency (TF-IDF), word-embedding, or machine learning based models.

13. The method according to claim 12, wherein the extracting of the text features comprises:
   performing cleaning by removing or stemming a stop word from the text comprising the transcript information of the video content; and
   extracting the text features from the cleaned text.

14. The method according to claim 8, further comprising: displaying the produced video summary.

* * * * *